UNITED STATES PATENT OFFICE.

WALTHER FELD AND GEORG VON KNORRE, OF CHARLOTTENBURG, GERMANY.

PROCESS OF MAKING SILICIUM COPPER.

SPECIFICATION forming part of Letters Patent No. 414,033, dated October 29, 1889.

Application filed November 12, 1888. Serial No. 290,604. (No specimens.)

*To all whom it may concern:*

Be it known that we, WALTHER FELD, chemist, and GEORG VON KNORRE, residents of the city of Charlottenburg, in the Kingdom of Prussia, Germany, have invented certain new and useful Improvements in the Process of Making Silicium Copper, of which the following is a specification.

The present invention relates to a method for producing copper containing a certain percentage of silicium and to obtain a product which excels in respect to hardness, firmness, resistance, and suitability for casting.

The essential part in this new method for the production of silicium copper consists in the smelting of the raw materials together with fossil-meal, (infusorial earth,) and with such substances which develop and discharge free chlorine or fluorine, so that by the influence of these last-named substances the fossil-meal is decomposed and chloride of silicium is formed, while the vapors of the latter produce the copper alloy or silicium copper.

The most suitable of all substances discharging chlorine is common salt, (sodium chloride.) Then follow in succession cupric chloride, chloride of magnesium, chloride of potassium, (silvine,) chloride of calcium, &c. For rendering the substances soluble by means of others discharging fluorine, none is more suitable for the purpose than fluor-spar.

In the following specification the new method of producing silicium copper is exemplified in two examples, in one of which the result is obtained by using a chlorine combination and in the other by using fluor-spar.

*Example I.*—A well-mixed compound or mingling consisting of one hundred and fifty parts of copper containing as little iron as possible, or one hundred and ninety parts of cupric oxide, fifty parts of fossil-meal, and thirty parts of common salt, is stirred up with tar into a plastic state. This mixture or mingling is shaped into pieces larger than a fist and placed in a crucible or in a furnace, wood or coal dust being strewn between the pieces to prevent their adhering to one another. After the charge has been strewn over with coal-dust, in order to prevent the tar from burning, the crucible or the mass in the furnace is exposed to a weak red heat till the tar is completely carbonized. The shaped pieces have thus become quite solid and contain finely-distributed coal sufficient for the reduction. In order to avoid the injurious influence of the sulphur contained in mineral coal, it is best to pile up the pieces in charcoal and a slag-forming flux of quartz and lime and smelt them down in a reverberatory furnace or in a shaft-furnace with blast. If a shaft-furnace is used, then there is formed in the upper part of this furnace sodium silicate under the influence of the common salt and the fossil-meal, while chlorine is freed. Owing to the presence of coal, this chlorine renders another part of the fossil-meal soluble, whereby chloride of silicium is formed, which is decomposed by the copper in its turn, and the result is the development of silicium copper and the disengagement of chlorine. Owing to the presence of coal, the chlorine just freed operates again on the excess of fossil-meal as already described and renders it soluble. Finally the chlorine escapes with the waste gases in the shape of free chlorine, and partly also as chloride of silicium. In the lower part of the furnace the easily-fusible silicium copper is smelted together, while the slag protects it from oxidation. The sulphur contained in the tar is rendered inoffensive by the chlorine escaping during the reduction. When tar containing 0.8 per cent. sulphur was used, no injurious influence on the product obtained by this process was observed. Chlorine was not detected in any case in the silicium copper produced.

By adhering to the proportions just described an alloy is produced with about eight per cent. silicium. In the place of common salt, equivalent quantities of chloride of copper, chloride of potassium, chloride of magnesium, and chloride of calcium may be used with the same success.

*Example II*—In the same measure as common salt and the other chlorides already named, fluor-spar promotes the development of silicium copper, although the product thus obtained contains a smaller amount of silicium than when common salt is used. Seventyfive parts of copper or ninety-five of cupric oxide, thirty parts of fluor-spar, and thirty parts of fossil-meal are stirred up, as in example I, with tar, and the plastic mass thus obtained is treated in the same way. The result is a product with about seven per cent. silicium.

According as the proportions of the mixture or mingling are altered, a product either richer or poorer in silicium is obtained.

A certain amount of silicium in copper and its alloys makes them easily fusible and better suited for casting, and, in addition to that, it adds to their hardness, firmness, and resistance. The silicium copper produced in the way just described is well adapted for making alloys, which have to excel in respect to the above qualities.

The silicium-copper alloys are an excellent material, particularly for casting bells, for making works of art, parts of machinery, cannons, wire ropes, cartridge-shells, and similar articles that require to have great resisting power, owing to the purpose for which they are used.

The peculiar quality of silicium to extract from copper the last residuum of oxygen in it makes silicium suitable as an addition material in the refining of copper.

Having now described our invention, and also the manner how and the means with which the same is to be performed, what we claim, and desire to secure by Letters Patent of the United States, is—

The production of silicium copper by smelting a mixture or mingling of copper or cupric oxide with coal or tar and fossil-meal with substances discharging chlorine or fluorine (such as common salt, chloride of copper, chloride of magnesium, chloride of potassium, chloride of calcium, &c., or fluor-spar, &c.) in a reverberatory furnace or in a shaft furnace.

In testimony whereof we have signed our names to this specification in the presence of two subscribing witnesses.

WALTHER FELD.
GEORG VON KNORRE.

Witnesses:
B. ROI,
MARO M. ROTTEN.